United States Patent
Demopoulos et al.

(10) Patent No.: US 9,588,595 B2
(45) Date of Patent: Mar. 7, 2017

(54) PASSWORD REVEAL SELECTOR

(75) Inventors: Ryan J. Demopoulos, Bellevue, WA (US); Christine C. Stawitz, Seattle, WA (US); Moneta Ho Kushner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 13/230,599

(22) Filed: Sep. 12, 2011

(65) Prior Publication Data

US 2013/0067385 A1 Mar. 14, 2013

(51) Int. Cl.
| | |
|---|---|
| *G06F 3/048* | (2013.01) |
| *G06F 3/023* | (2006.01) |
| *G06F 21/31* | (2013.01) |
| *H04L 29/06* | (2006.01) |
| *G06F 21/84* | (2013.01) |

(52) U.S. Cl.
CPC ............ *G06F 3/0233* (2013.01); *G06F 21/31* (2013.01); *G06F 21/84* (2013.01); *G06F 2221/032* (2013.01); *H04L 63/0846* (2013.01)

(58) Field of Classification Search
CPC .......... G06F 21/46; G06F 21/31; G06F 21/84; B43K 23/008; B43K 24/06; B43K 25/02; B43K 29/00; B43K 29/003; B43K 29/004; B43K 29/08; B43K 29/093; B43K 29/10; B43K 7/005; B43K 7/02; H04N 2201/3205; H04L 63/0846; H04L 63/083
USPC ........................................................ 715/780
See application file for complete search history.

(56) References Cited

U.S. PATENT DOCUMENTS

| | | |
|---|---|---|
| 5,428,349 A | 6/1995 | Baker |
| 6,072,484 A | 6/2000 | Kuroda |
| 6,209,102 B1 | 3/2001 | Hoover |
| 6,308,042 B1 | 10/2001 | Marsh et al. |
| 6,691,138 B1 | 2/2004 | Kirkpatrick et al. |
| 6,747,676 B2 | 6/2004 | Botz et al. |
| 7,299,359 B2 | 11/2007 | Hurley |

(Continued)

FOREIGN PATENT DOCUMENTS

| | | |
|---|---|---|
| CN | 101075284 | 11/2007 |
| CN | 101284032 | 10/2008 |

(Continued)

OTHER PUBLICATIONS

"Disabling a button if the textbox is empty using Javascript", Jul. 10, 2009, retrieved from http://forums.asp.net/t/1445574.aspx, pp. 4.*

(Continued)

*Primary Examiner* — Jaime Duckworth
(74) *Attorney, Agent, or Firm* — Timothy Churna; Dan Choi; Micky Minhas (57) ABSTRACT

In embodiments of a password reveal selector, a password entry box is displayed for input of password characters of a password, and the password entry box includes a password reveal selector for user-selection to reveal the password. The password reveal selector is initially concealed from view when the password entry box is displayed. The password characters can be received in the password entry box and the password characters are obfuscated when displayed. The password reveal selector can then be displayed for user-selection according to a selector display condition.

20 Claims, 5 Drawing Sheets

(56) References Cited

U.S. PATENT DOCUMENTS

| | | | |
|---|---|---|---|
| 7,421,666 | B2 | 9/2008 | Vale |
| 7,818,691 | B2 | 10/2010 | Irvine |
| 8,990,726 | B2 | 3/2015 | Demopooulos et al. |
| 2002/0066039 | A1 | 5/2002 | Dent |
| 2002/0070964 | A1* | 6/2002 | Botz et al. ............ 345/741 |
| 2003/0110402 | A1 | 6/2003 | Park |
| 2004/0030933 | A1 | 2/2004 | Park |
| 2006/0053301 | A1 | 3/2006 | Shin |
| 2006/0056626 | A1* | 3/2006 | Keohane et al. ........ 380/206 |
| 2007/0033647 | A1 | 2/2007 | Yang et al. |
| 2007/0157124 | A1* | 7/2007 | Haug ............ G06F 17/245 715/835 |
| 2008/0068638 | A1* | 3/2008 | Yagi ..................... 358/1.14 |
| 2008/0072320 | A1* | 3/2008 | Hurley ..................... 726/21 |
| 2008/0221963 | A1 | 9/2008 | Altshule et al. |
| 2008/0229230 | A1 | 9/2008 | Grigoriev et al. |
| 2009/0013279 | A1* | 1/2009 | Klems et al. ............ 715/780 |
| 2009/0033628 | A1* | 2/2009 | Srivastava ............. 345/169 |
| 2009/0300755 | A1 | 12/2009 | Pakhunov |
| 2010/0064375 | A1* | 3/2010 | Gorczowski ........ G06F 3/0484 726/28 |
| 2011/0270876 | A1 | 11/2011 | Gill et al. |
| 2013/0067386 | A1 | 3/2013 | Demopoulos |

FOREIGN PATENT DOCUMENTS

| | | |
|---|---|---|
| CN | 101286848 | 10/2008 |
| CN | 101384032 | 3/2009 |
| CN | 101609534 | 12/2009 |
| JP | 2002536762 | 10/2002 |
| JP | 2005078472 A | 3/2005 |
| JP | 2007172385 | 7/2007 |
| JP | 2007188515 | 7/2007 |
| JP | 2009516247 | 4/2009 |
| KR | 20070084714 A | 8/2007 |

OTHER PUBLICATIONS

"Style Object display Property", Oct. 17, 2009, retrieved from http://www.w3schools.com/jsref/prop_style_display.asp; pp. 3.*

Canisbos., "Reveal the Password in a Password Field on a Web Page", Retrieved at <<http://hints.macworld.com/article.php?story=20110329103432511>>, Mar. 31, 2011, pp. 4.

"How to Reveal Hidden Passwords and Unmask Asterisks Without Using any Software!!", Retrieved at <<http://www.inspiredgeek.com/2011/02/05/how-to-reveal-hidden-passwords-and-unmask-asterisks-without-using-any-software/>>, Aug. 9, 2011, pp. 3.

Edwards, James., "Better Passwords #1: The Masked Password Field", Retrieved at <<http://www.sitepoint.com/better-passwords-1-the-masked-password-field/>>, Jul. 19, 2010, pp. 12.

"Mozilla Password Manager Tricks", Retrieved at <<http://burntelectrons.org/moz/moz-passwords.html#reveal1>>, Retrieved Date: Aug. 8, 2011, pp. 3.

"Clear icon inside input text", Retrieved from <http://stackoverflow.com/questions/6258521/clear-icon-inside-input-text> on Jul. 1, 2013, (Jun. 6, 2011), 8 pages.

"CSS min-width Property", Retrieved from <http://www.w3schools.com/cssref/pr_dim_min-width.asp> on Jul. 1, 2013, (Jul. 3, 2011), 3 pages.

"Form Field Limiter v2.0", Retrieved from <http://www.dynamicdrive.com/dynamicindex16/limitinput.htm> on Jul. 1, 2013, (Feb. 25, 2009), 2 pages.

"Non-Final Office Action", U.S. Appl. No. 13/230,603, (Jul. 9, 2013),12 pages.

"International Search Report", Mailed Date: Sep. 25, 2012, Application No. PCT/US2011/055627, Filed Date: Oct. 10, 2011, pp. 8.

Chee, Dexter S., et al., "User's Mouse/Cursor Movements in Two Web-Based Library Catalog Interfaces", *Proceedings: International Conference on Work with Computing Systems (WWCS)*; retrieved from http://www.ntu.edu.sg/home/assgkhoo/papers/chee_khoo.cursor_movements.WWWCS2004.pdf, (2004), 6 pages.

"Final Office Action", U.S. Appl. No. 13/230,603, Jan. 30, 2014, 14 pages.

"Foreign Office Action", CN Application No. 201210335732.7, Oct. 10, 2014, 18 pages.

"Notice of Allowance", U.S. Appl. No. 13/230,603, Nov. 19, 2014, 8 pages.

"Foreign Office Action", CN Application No. 201210335732.7, Mar. 30, 2015, 14 pages.

"Extended European Search Report", EP Application No. 11872231.3, Jul. 7, 2015, 6 pages.

"Foreign Office Action", CN Application No. 201210335732.7, Sep. 25, 2015, 18 pages.

"Foreign Office Action", JP Application No. 2014-529678, Sep. 8, 2015, 4 pages.

Yihu,"Android EditView Text Code Display and Concealment", http://forums.asp.net/t/445574.aspx, Aug. 10, 2011, 1 pages.

"Foreign Office Action", JP Application No. 2014-529678, May 31, 2016, 5 pages.

Manual Notification, 13123123.

"Foreign Office Action", CN Application No. 201210335732.7, Mar. 17, 2016, 11 Pages.

"Foreign Office Action", CN Application No. 201210335732.7, Oct. 10, 2016, 16 pages.

\* cited by examiner

PASSWORD REVEAL SELECTOR

BACKGROUND

Portable computing devices, such as mobile phones, portable and tablet computers, entertainment devices, handheld navigation devices, and the like are commonly implemented with a touch-screen display designed for user touch-input of text characters and passwords, such as in text entry boxes in a user interface form, page, or document. Text editing controls allow a user to input text characters into a text box, such as on a touch-screen, or with a keyboard, mouse, or similar input device.

A device user may enter a password into a text box, such as in a user interface page, and the password characters are obfuscated so as not to reveal the password as the user enters it. If the user suspects a mistake while entering the password characters, the user cannot see which characters of the password may have been entered incorrectly. The entry of an incorrect password can lead to several undesired results. For example, an authentication service can take a considerable amount of time to verify an incorrect password. Further, an authentication service may only allow a user a limited number of attempts to enter a correct password before the system locks the user out. Additionally, when an incorrect password is entered, the system typically clears all of the password text, which forces a user to re-enter the entire password again.

Techniques that attempt to address these undesired results from the entry of an incorrect password have inherent limitations and security disadvantages. For example, some computing systems limit passwords to simple characters, such as only a personal identification number (PIN) of numbers. This fundamentally restricts the inherent strength of alphanumeric passwords and is generally only suitable for low-security implementations. Other computing systems display a user interface or pop-up that allows the user to see the password characters as the user enters the password, which can compromise the intended security if others can see the password as it is being entered, particularly in public settings.

SUMMARY

This Summary introduces simplified concepts of a password reveal selector, and the concepts are further described below in the Detailed Description and/or shown in the Figures. This Summary should not be considered to describe essential features of the claimed subject matter, nor used to determine or limit the scope of the claimed subject matter.

A password reveal selector is described. In embodiments, a password entry box is displayed for input of password characters of a password, and the password entry box includes a password reveal selector for user-selection to reveal the password. The password reveal selector is initially concealed from view when the password entry box is displayed. The password characters can be received in the password entry box and the password characters are obfuscated when displayed. The password reveal selector can then be displayed for user-selection according to a selector display condition.

The selector display condition can be based on a parameter that indicates a maximum number of the password characters the password entry box is implemented to receive. This is also referred to as the width of the password entry box, and the password reveal selector can be displayed if the width parameter is at least a minimum number. Alternatively, the password reveal selector can be displayed if the width parameter is at least a minimum number and when at least one of the password characters is received. Alternatively, the password reveal selector can be displayed based on just a number of the password characters that are received, and the password reveal selector is displayed if at least a minimum number of the password characters are received.

In other embodiments, a user-selection of the password reveal selector can be received, and then the password is revealed in the password entry box for as long as the user-selection of the password reveal selector is received. Alternatively, the password is revealed in the password entry box after a timing delay for as long as the user-selection of the password reveal selector is received. A message may also be displayed during the timing delay to indicate that the password will be revealed after the timing delay. Alternatively or in addition, the password can be revealed in the password entry box for a duration of time after the user-selection of the password reveal selector is received. In other embodiments, the password reveal selector may be implemented as a toggle selector switch, in which case, the password is revealed in the password entry box when a first user-selection of the password reveal selector is received, and then the password characters are again obfuscated in the password entry box when a second user-selection of the password reveal selector is received.

BRIEF DESCRIPTION OF THE DRAWINGS

Embodiments of a password reveal selector are described with reference to the following Figures. The same numbers may be used throughout to reference like features and components that are shown in the Figures.

DETAILED DESCRIPTION

Embodiments of a password reveal selector are described. As noted above, a device user may enter a password into a text entry box, such as in a user interface page, and the password characters are obfuscated so as not to reveal the password as the user enters it. If the user suspects a mistake while entering the password characters, the user cannot see which characters of the password may have been entered incorrectly. In embodiments, a password entry box is displayed for input of password characters of a password, and the password entry box includes a password reveal selector for user-selection to reveal the password. The password reveal selector is initially concealed from view when the password entry box is displayed. The password characters are received in the password entry box and the password characters are obfuscated when displayed to maintain the security of the password.

The password reveal selector can then be displayed for user-selection according to a selector display condition. For example, the selector display condition can be based on a width parameter that indicates a maximum number of the password characters the password entry box is implemented to receive. The password reveal selector can be displayed if the width parameter is at least a minimum number. Alternatively, the password reveal selector can be displayed if the width parameter is at least a minimum number and when at least one of the password characters is received. Alternatively, the password reveal selector can be displayed based on just a number of the password characters that are received, and the password reveal selector is displayed for user-selection if at least a minimum number of the password characters are received.

When a user selects the password reveal selector, the password can be revealed in the password entry box for as long as the user-selection of the password reveal selector is received (e.g., for as long as the user maintains the selection). Alternatively, the password is revealed in the password entry box after a timing delay for as long as the user-selection of the password reveal selector is received. A message may also be displayed during the timing delay to indicate that the password will be revealed after the timing delay.

Alternatively or in addition, the password can be revealed in the password entry box for a duration of time after the user-selection of the password reveal selector is received. For example, the user can select the password reveal selector and then release the selection. The password is then revealed and displayed for viewing in the password entry box for a designated duration of time. In another embodiment, the password reveal selector may be implemented as a toggle selector switch, in which case, the password is revealed in the password entry box when a first user-selection of the password reveal selector is received, and then the password characters are again obfuscated in the password entry box when a second user-selection of the password reveal selector is received.

While features and concepts of a password reveal selector can be implemented in any number of different devices, systems, environments, and/or configurations, embodiments of a password reveal selector are described in the context of the following example devices, systems, and methods.

Figure 1:
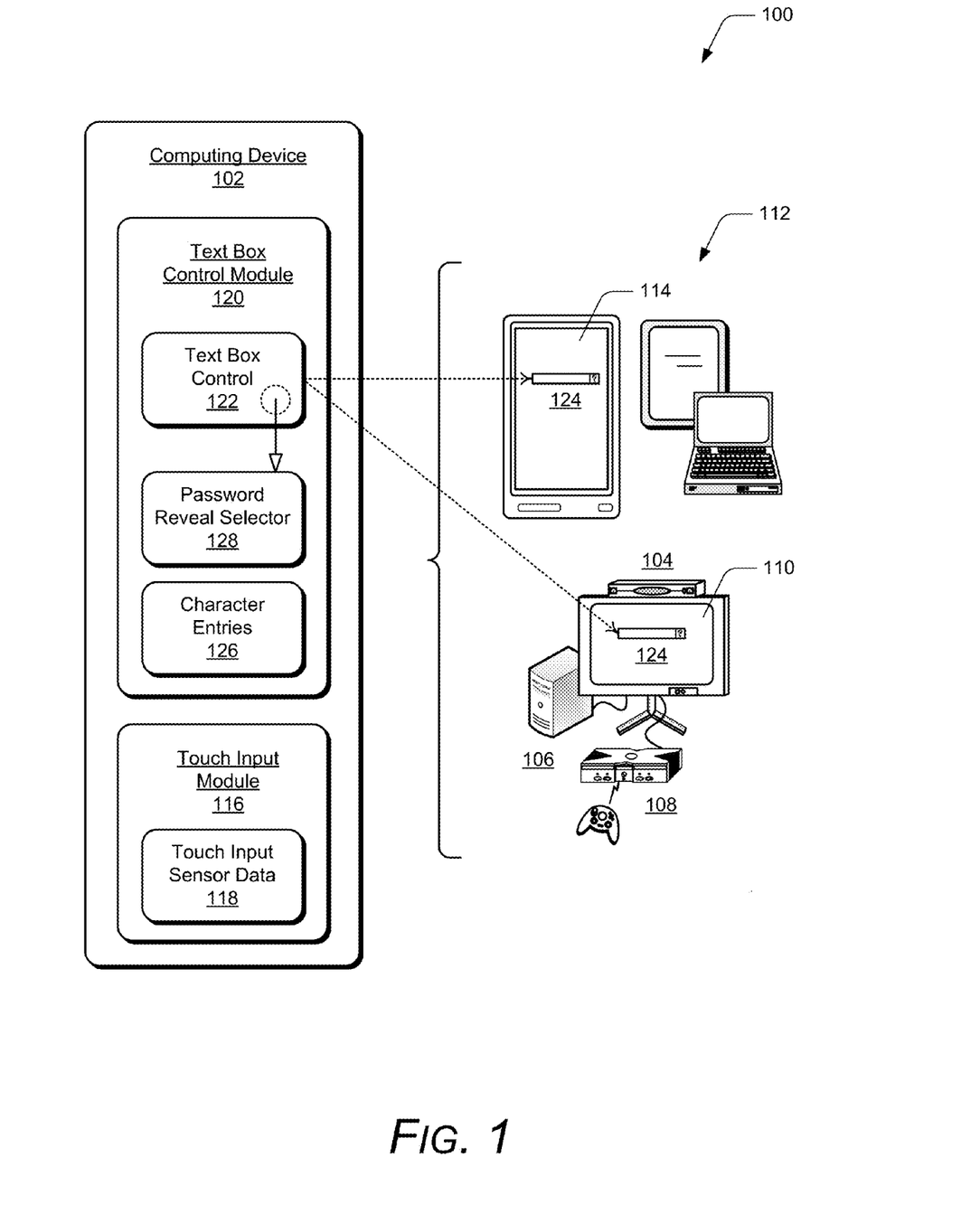
FIG. 1 illustrates an example system in which embodiments of a password reveal selector can be implemented.

FIG. 1 illustrates an example system 100 in which embodiments of a password reveal selector can be implemented. The example system 100 includes a computing device 102, which may be any one or combination of a fixed or mobile device, in any form of a consumer, computer, portable, communication, navigation, media playback, entertainment, gaming, tablet, and/or electronic device. For example, the computing device 102 can be implemented as a television client device 104, a computer 106, and/or a gaming system 108 that is connected to a display device 110 to display media content. Alternatively, the computing device may be any type of portable computer, mobile phone, or portable device 112 that includes an integrated display 114. Any of the computing devices can be implemented with various components, such as one or more processors and memory devices, as well as with any combination of differing components as further described with reference to the example electronic device shown in FIG. 5.

The integrated display 114 of a computing device 102, or the display device 110, may be a touch-screen display that is implemented to sense touch and gesture inputs, such as a user-initiated character, key, typed, or selector input in a user interface that is displayed on the touch-screen display. Alternatively or in addition, the examples of computing devices may include other various input mechanisms and devices, such as a keyboard, mouse, on-screen keyboard, remote control device, game controller, or any other type of user-initiated and/or user-selectable input device. In implementations, the computing device 102 may include a touch input module 116 that recognizes touch input sensor data 118, such as on-screen keyboard character inputs and other user-selected touch inputs.

The computing device includes a text box control module 120 that can be implemented as computer-executable instructions, such as a software application or module that is executed by one or more processors to implement the various embodiments described herein. The text box control module includes a text box control 122 that can be instantiated as a text box 124, such as a password entry box, for display on the integrated display 114 of a computing device 102, or for display on the display device 110. The text box 124 can be implemented as any type of text entry box, password entry box, or form control that is instantiated in a user interface, such as a form, HTML page, or document to facilitate user input of character entries 126 (e.g., letters, numbers, and/or other alphanumeric characters). In embodiments, the text box control 122 includes a password reveal selector 128 that can be incorporated as part of the text box control and bound to the text box control when instantiated in a user interface, such as in a form, page, or document that includes a text box 124 for character entries 126.

Figure 2:
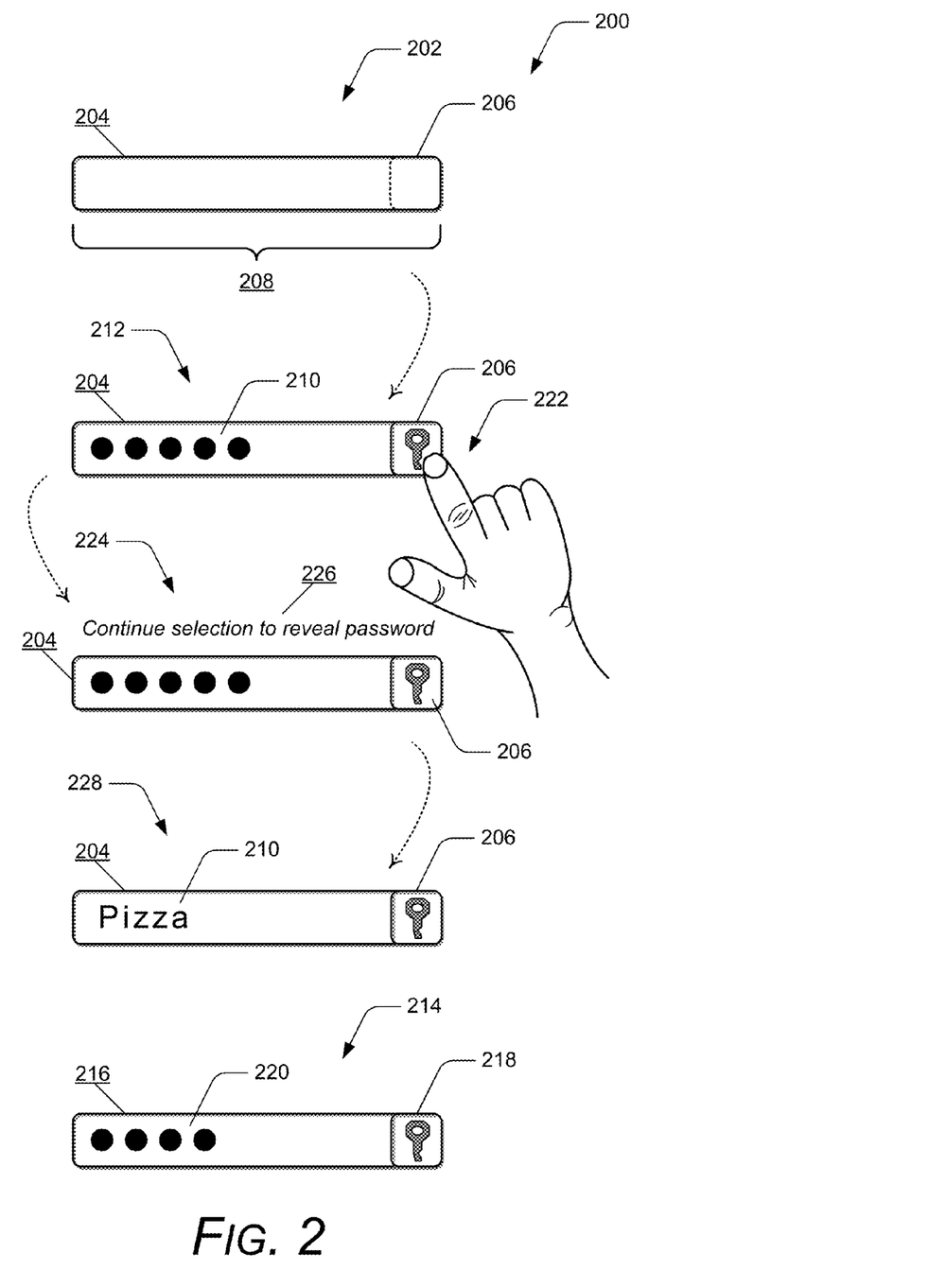
FIG. 2 illustrates examples of a password reveal selector in accordance with one or more embodiments.

FIG. 2 illustrates examples 200 of password entry boxes that include a password reveal selector, such as can be implemented by the computing device 102 and the various components described with reference to FIG. 1. For example, a user interface, such as a form or HTML page, can include a password entry box in which a user enters password characters of a password, and the password entry box includes a password reveal selector implemented for user-selection to reveal the password that is displayed in the password entry box. The text box control module 120 at computing device 102 can instantiate a password entry box that includes a password reveal selector.

As shown at 202, a password entry box 204 includes a password reveal selector 206, which is initially concealed from view when the password entry box is displayed in this example. The dashed outline of the concealed password reveal selector 206 is shown merely to illustrate that the password entry box 204 is implemented to include the password reveal selector. In practice, the password reveal selector is concealed from view and not visible to the user.

The password entry box 204 can include a parameter that indicates a maximum number of password characters the password entry box is implemented to receive. This is also commonly referred to as the width of the password entry box. For example, the password entry box 204 includes a width parameter 208 that indicates a width of the password entry box. The width parameter of a password entry box can be specified by an application developer as a part of a text box editing interface. In this example, the width parameter 208 encompasses all of the password entry box 204, to include the password reveal selector 206. Alternatively, the password reveal selector may be positioned for display outside the width of the password entry box and/or not included within the width parameter.

In embodiments, the password reveal selector of a password entry box can be displayed based on a selector display condition, such as based on whether the width parameter (e.g., the width of a password entry box) is at least a minimum number. For example, the password entry box 204 may have a width parameter 208 of ten characters, which indicates that the password entry box can have ten password characters. The selector display condition may then be based on whether the width parameter is at least five password characters, in which case, the password reveal selector 206 is displayed when at least one password character is received in the password entry box. When at least one password character 210 is received in the password entry box, the password reveal selector 206 is then displayed for user-selection as shown at 212.

Alternatively, the password reveal selector 206 may be implemented to display based on whether the width parameter 208 of the password entry box is at least a minimum number and also based on a minimum number of password characters received in the password entry box 204. For example, the selector display condition may be based on whether the width parameter 208 is a minimum of at least five password characters, and whether at least four password characters have been entered in the password entry box. In implementations, the password reveal selector 206 may be concealed for a password that is shorter in character length, such as for a password that only has four or five characters. A minimum character length for passwords can optionally be specified by a developer, or may be a user-configurable parameter that a user of the computing device can manage.

Alternatively, a selector display condition may simply be based on a minimum number of password characters received in the password entry box, regardless of the width parameter. For example, as shown at 214, an alternative password entry box 216 includes a password reveal selector 218 that is implemented to be initially concealed from view, and then displayed when a minimum number of password characters 220 are entered in the password entry box, such as a minimum of four password characters. In implementations, the width parameters and the selector display conditions (e.g., a minimum width parameter, and at least a minimum number of password characters) are optionally configurable and can be specified by an application developer.

As shown in the examples, the password characters 210 for a password are initially obfuscated in the password entry box 204 to conceal the password from view and preclude others from obtaining the password from the user. The password reveal selector 206 of the password entry box 204 is implemented for user-selection to reveal the password in the password entry box. For example, on a touch-screen display, a user can press to select the password reveal selector 206 as shown at 222 to initiate revealing the password characters 210 in the password entry box. Alternatively, a user may select the password reveal selector by holding down a mouse button, with a keyboard shortcut, or other user-selectable mechanism. In implementations, the text box control module 120 at the computing device 102 initiates revealing the password (e.g., displaying the password characters) in the password entry box when a user-selection of the password reveal selector is received.

In embodiments, a user may select the password reveal selector 206 as shown at 222 and, as shown at 224, a message 226 is displayed to indicate that the password will be revealed after a timing delay. The timing delay before the password is revealed can be configurable from zero to any duration of time, such as a delay of a few seconds. For a timing delay of zero seconds, the password is revealed at approximately the same time as when the user selects or presses the password reveal selector. Alternatively or in addition, the password can be revealed in the password entry box for as long as the user-selection of the password reveal selector is received. For example, when the user presses to select the password reveal selector 206 as shown at 222 to initiate revealing the password in the password entry box, the password is revealed and displayed for viewing as shown at 228 for as long as the user-selection of the password reveal selector 206 is maintained (e.g., and optionally after the timing delay and/or message 226 is displayed).

In alternate embodiments, the password can be revealed in the password entry box 204 for a duration of time after a user-selection of the password reveal selector 206 is received. For example, the user can press to select the password reveal selector as shown at 222, and then release the selection. The password is then revealed and displayed for viewing in the password entry box as shown at 228 for a duration of time, which can be configurable from zero to any duration of time. For example, the password may be revealed for a few seconds. Alternatively, the password reveal selector 206 can be implemented as a toggle selector, and the password characters are revealed to display the password in the password entry box after a first user-selection of the password reveal selector is received. The password characters are then obfuscated again in the password entry box after a second user-selection of the password reveal selector is received to toggle the selector.

In the examples 200, the password reveal selector 206 is shown positioned on the right side of the password entry box 204 so as to avoid blocking the view of a revealed password when the user selects the password reveal selector with his or her right hand, such as shown at 222. Although the password reveal selector is shown on the right side of the password entry box to accommodate viewing the password from left-to-right, such as for the printed English language, the password reveal selector may be implemented in any other position associated with the password entry box to accommodate viewing the password, such as for a printed language that is read from right-to-left, or from top-to-bottom. Optionally, the position of the password reveal selector relative to the password entry box may be user-configurable, such as for a left-handed user who may prefer the password reveal selector positioned on the left side of the password entry box.

Example methods 300 and 400 are described with reference to FIGS. 3 and 4 in accordance with one or more embodiments of a password reveal selector. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
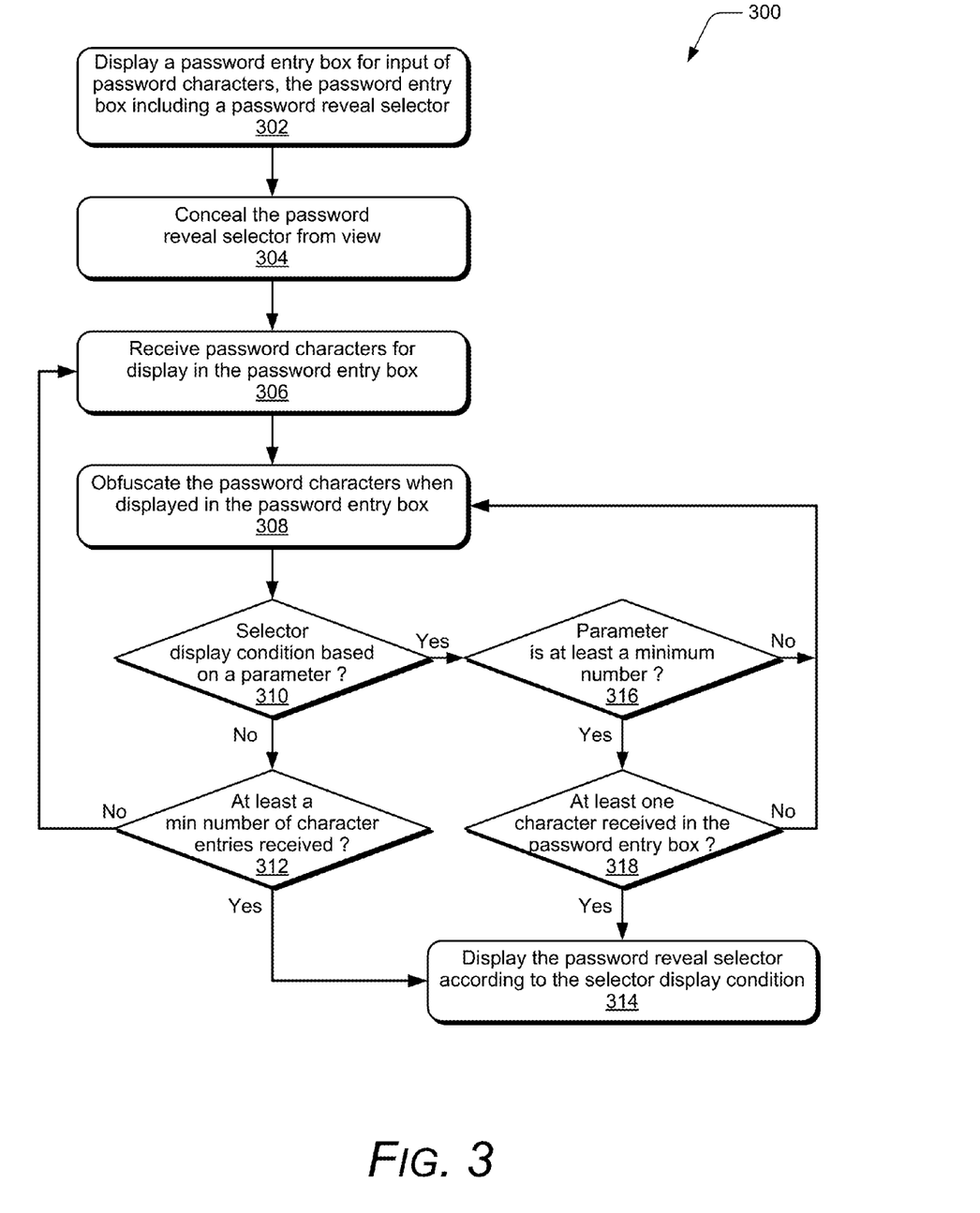
FIG. 3 illustrates example method(s) of a password reveal selector in accordance with one or more embodiments.

FIG. 3 illustrates example method(s) 300 of a password reveal selector. The order in which the method blocks are described are not intended to be construed as a limitation, and any number of the described method blocks can be combined in any order to implement a method, or an alternate method.

At block 302, a password entry box is displayed for input of password characters of a password, the password entry box including a password reveal selector for user-selection to reveal the password. For example, the text box control module 120 at computing device 102 (FIG. 1) instantiates for display the password entry box 204 that includes the password reveal selector 206 (FIG. 2). Any of the password entry boxes can be implemented to receive one or more password characters by designation of a width parameter that indicates a maximum number of password characters for a password entry box.

At block 304, the password reveal selector is concealed from view. For example, the password entry box 204 includes the password reveal selector 206, which is initially concealed from view when the password entry box is displayed because a password character of a password has not yet been received in the password entry box. When at least one password character 210 is received in the password entry box as shown at 212, the password reveal selector 206 is then displayed for user-selection to initiate revealing the password.

At block 306, password characters are received for display in the password entry box and, at block 308, the password characters are obfuscated when displayed in the password entry box. For example, the computing device 102 receives the character entries 126 for a password from any type of input device, such as a keyboard, mouse, on-screen keyboard, remote control device, game controller, or any other type of user-initiated and/or user-selectable input device. In the examples 200, the password entry box 204 includes password characters 210 that are obfuscated to conceal the entries from view and preclude others from obtaining the password.

At block 310, a determination is made as to whether a selector display condition is based on a parameter, such as based on a width parameter of a password entry box that indicates a maximum number of password characters the password entry box is implemented to receive. If the selector display condition is not based on a parameter (i.e., "no" from block 310), then at block 312, a determination is made as to whether a minimum number of password characters have been received for display in the password entry box. A selector display condition may simply be based on a minimum number of password characters received in a password entry box, regardless of the width parameter. For example, the password entry box 204 includes the password reveal selector 206, which is initially concealed from view and then displayed when a minimum number of password characters are entered in the password entry box.

If at least a minimum number of password characters have been received for display in the password entry box (i.e., "yes" from block 312), then at block 314, the password reveal selector is displayed according to the selector display condition. If the minimum number of password characters has not been received (i.e., "no" from block 312), then the method continues at blocks 306 and 308 to receive password characters obfuscated for display in the password entry box.

If the selector display condition is based on a parameter, such as based on the width parameter of the password entry box (i.e., "yes" from block 310), then at block 316, a determination is made as to whether the parameter is at least a minimum number. For example, the password entry box 204 may have a width parameter 208 of ten password characters, which indicates that a password in the password entry box can have ten password characters. The selector display condition may then be based on whether the width parameter is at least five password characters, in which case, the password reveal selector 206 is displayed when at least one password character is received in the password entry box.

If the parameter is at least a minimum number (i.e., "yes" from block 316), then at block 318, a determination is made as to whether at least one password character has been received in the password entry box. If at least one password character has been received in the password entry box (i.e., "yes" from block 318), then at block 314, the password reveal selector is displayed according to the selector display condition. If the parameter is not at least a minimum number (i.e., "no" from block 316), or if a password character has not been received for display in the password entry box (i.e., "no" from block 318), then the method continues at blocks 306 and 308 to receive password characters obfuscated for display in the password entry box.

Figure 4:
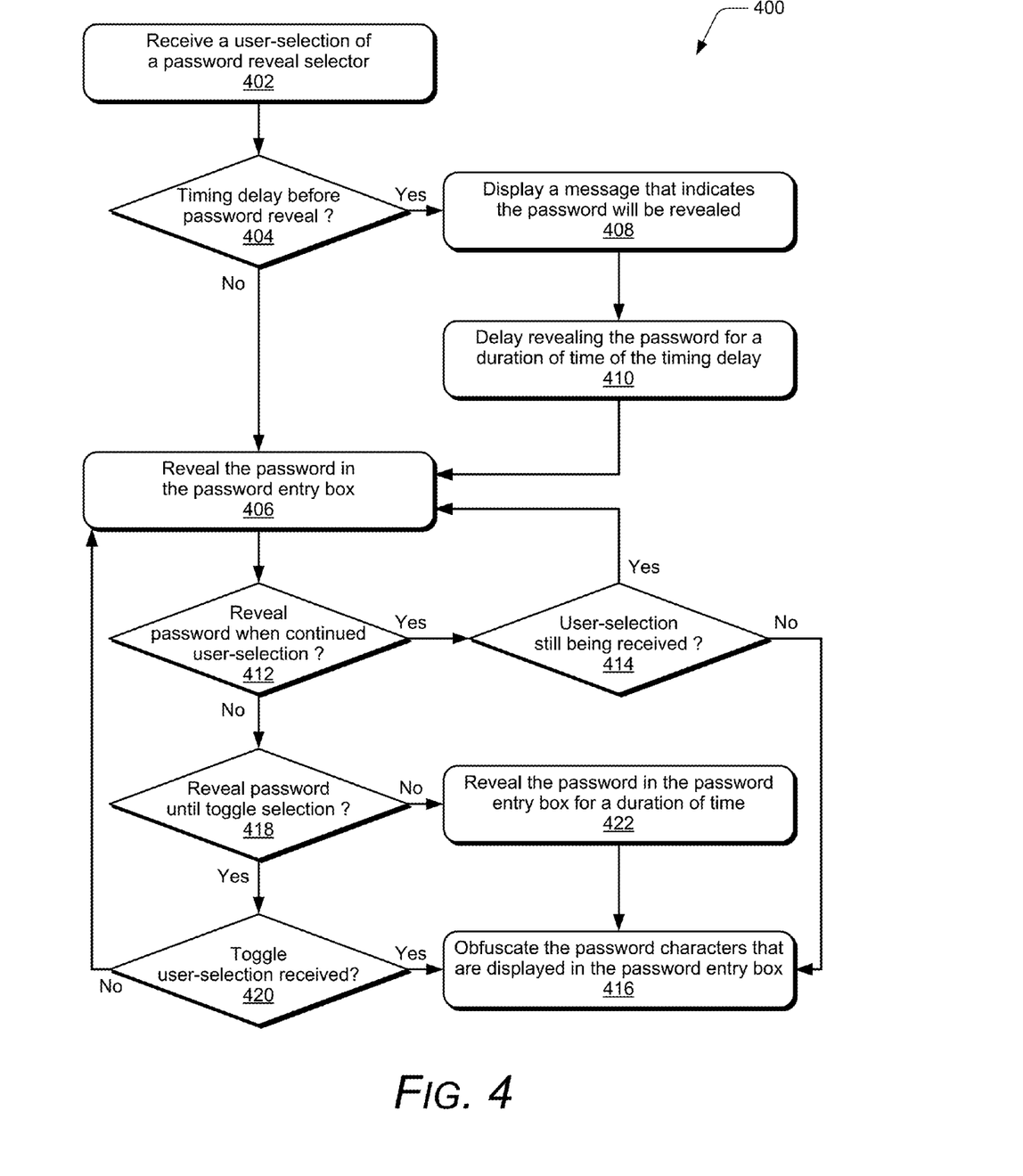
FIG. 4 illustrates example method(s) of a password reveal selector in accordance with one or more embodiments.

FIG. 4 illustrates example method(s) 400 of a password reveal selector. The order in which the method blocks are described are not intended to be construed as a limitation, and any number of the described method blocks can be combined in any order to implement a method, or an alternate method.

At block 402, a user-selection of a password reveal selector is received. For example, on a touch-screen display, a user can press the password reveal selector 206 as shown at 222 to initiate revealing the password in the password entry box 204. The text box control module 120 at the computing device 102 initiates revealing the password characters 210 of the password in the password entry box when the user-selection of the password reveal selector is received.

At block 404, a determination is made as to whether there is a timing delay before the password is revealed when a user-selection of the password reveal selector is received. For example, a user may select the password reveal selector 206 as shown at 222 and the text box control module 120 at the computing device 102 initiates a timing delay before the password is revealed. The timing delay can be configurable from zero to any duration of time, such as a delay of a few seconds. For a timing delay of zero seconds, the password is revealed at approximately the same time as when the user selects or presses the password reveal selector.

If there is not a timing delay before the password is revealed (i.e., no from block 404), then at block 406, the password characters that are displayed in the password entry box are displayed to reveal the password. For example, the password is revealed in the password entry box 204 as shown at 228 when the user presses the password reveal selector 206, such as on the touch-screen display.

If there is a timing delay before the password characters are revealed (i.e., yes from block 404), then at block 408, a message is displayed that indicates the password will be revealed after the timing delay and, at block 410, revealing the password is delayed for a duration of time according to the timing delay. For example, the text box control module 120 at the computing device 102 initiates displaying the message 226 to indicate that the password will be revealed after the timing delay, and the password is then revealed in the password entry box at block 406 after the timing delay.

At block 412, a determination is made as to whether the password characters continue to be revealed based on a continued user-selection of the password reveal selector. For example, when the user presses to select the password reveal selector 206 as shown at 222 to initiate revealing the password in the password entry box 204, the password is revealed and displayed for viewing as shown at 228 for as long as the user-selection of the password reveal selector 206 is maintained.

If the password characters continue to be revealed based on a continued user-selection of the password reveal selector (i.e., yes from block 412), then at block 414, a determination is made as to whether the user-selection of the password reveal selector is still being received as described with reference to block 402. If the user-selection of the password reveal selector is still being received (i.e., yes from block 414), then the method continues at block 406 to reveal the password in the password entry box. If the user-selection of the password reveal selector is not still being received (i.e., no from block 414), then at block 416, the password characters that are displayed in the password entry box are obfuscated so that the password is no longer viewable on the display.

If continuing to reveal the password characters is not based on a continued user-selection of the password reveal selector (i.e., no from block 412), then at block 418, a determination is made as to whether the password is revealed based on a toggle selection of the password reveal selector. For example, a user can initiate revealing the password by selecting the password reveal selector a first time, and then while the password characters of the password are revealed and viewable, select the password reveal selector a second time to initiate obfuscating the password characters so that they are no longer viewable on the display.

If the password is revealed based on a toggle selection of the password reveal selector (i.e., yes from block 418), then at block 420, a determination is made as to whether a toggle user-selection of the password reveal selector has been received. If a toggle user-selection of the password reveal selector has not been received (i.e., no from block 420), then the method continues at block 406 to reveal the password that is displayed in the password entry box. If a toggle user-selection of the password reveal selector has been received (i.e., yes from block 420), then the method continues at block 416 to obfuscate the password characters that are displayed in the password entry box so that the password is no longer viewable on the display.

If the password is not revealed based on a toggle selection of the password reveal selector (i.e., no from block 418), then at block 422, the password is revealed in the password entry box for a duration of time. For example, a user can select the password reveal selector 206 in the password entry box 204 to initiate revealing the password, which is then displayed for viewing for a duration of time, such as a few seconds so that the user can view the password characters that have been entered. The method then continues at block 416 after the duration of time to obfuscate the password characters that are displayed in the password entry box so that the password is no longer viewable on the display.

Figure 5:
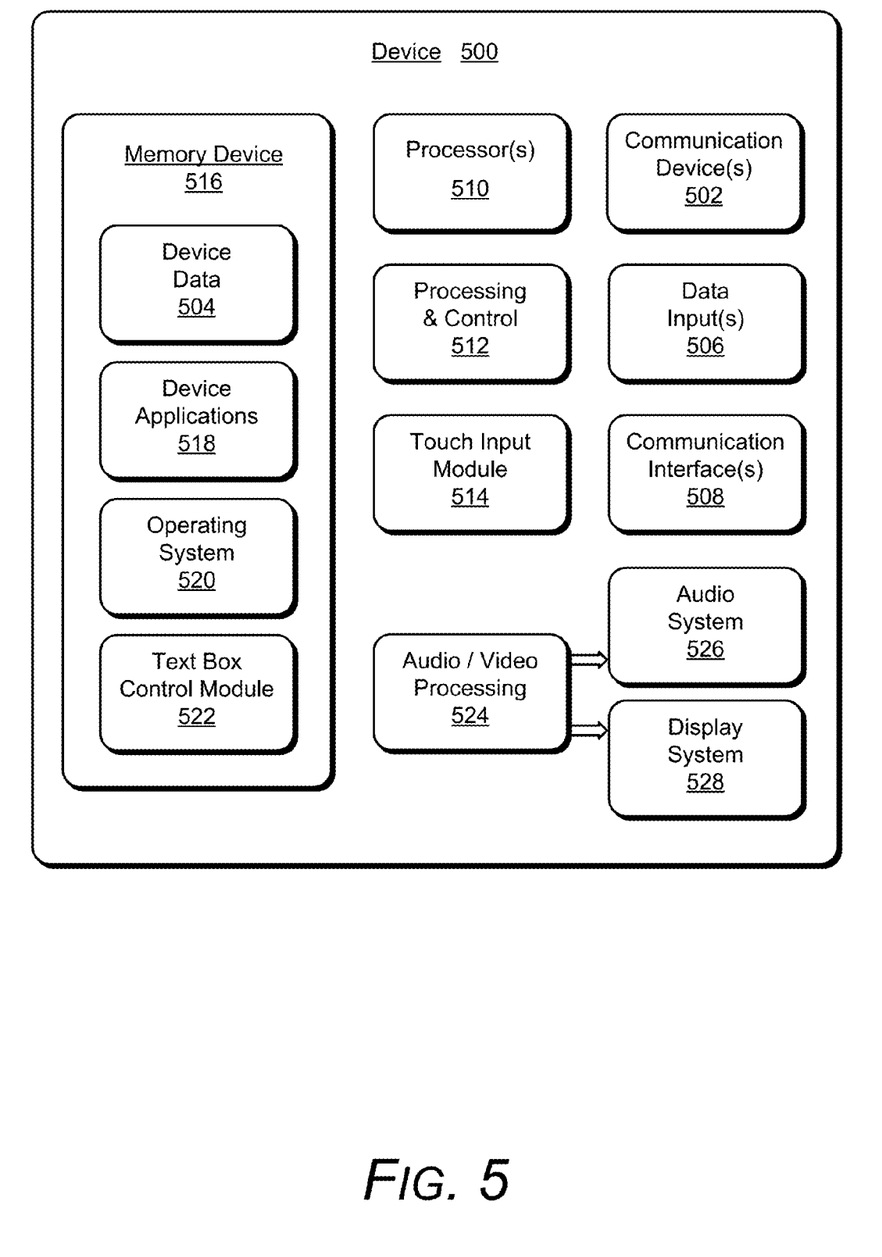
FIG. 5 illustrates various components of an example device that can implement embodiments of a password reveal selector.

FIG. 5 illustrates various components of an example device 500 that can be implemented as any of the devices, or services implemented by devices, described with reference to the previous FIGS. 1-4. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 500 includes communication devices 502 that enable wired and/or wireless communication of device data 504, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 506 via which any type of data, media content, and/or inputs can be received, such as user-selectable inputs and any other type of audio, video, and/or image data received from any content and/or data source.

The device 500 also includes communication interfaces 508, such as any one or more of a serial, parallel, network, or wireless interface. The communication interfaces provide a connection and/or communication links between the device and a communication network by which other electronic, computing, and communication devices communicate data with the device.

The device 500 includes one or more processors 510 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 512. In embodiments, the device 500 can also include a touch input module 514 that is implemented to recognize touch input sensor data. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 500 also includes one or more memory devices 516 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 516 provides data storage mechanisms to store the device data 504, other types of information and/or data, and various device applications 518. For example, an operating system 520 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 518 include a text box control module 522 that implements embodiments of a password reveal selector as described herein.

The device 500 also includes an audio and/or video processing system 524 that generates audio data for an audio system 526 and/or generates display data for a display system 528. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device, such as an integrated touch-screen display.

Although embodiments of a password reveal selector have been described in language specific to features and/or methods, the appended claims are not necessarily limited to the specific features or methods described. Rather, the specific features and methods are disclosed as example implementations of a password reveal selector.

The invention claimed is:

1. A method, comprising:
   displaying a password entry box configured for input of password characters of a password, the password entry box including a password reveal selector for user-selection to reveal the password characters of the password, the password reveal selector initially concealed from view while the password entry box is displayed, a position of the password reveal selector based on a location that does not block a display of the password in the password entry box, the position of the password reveal selector relative to the password entry box being configurable by a user;
   receiving the password characters in the password entry box, the password characters obfuscated while displayed in the password entry box;
   displaying the password reveal selector according to a selector display condition, the selector display condition being based on a parameter that indicates a maximum number of the password characters the password entry box is implemented to receive, the password reveal selector displayed if the parameter is at least a minimum number;
   receiving the user-selection of the password reveal selector via a user input;
   revealing the password in the password entry box for a duration of time responsive to said receiving the user-selection of the password reveal selector; and
   obfuscating the password characters in the password entry box after the duration of time without receiving an additional user-selection.

2. A method as recited in claim 1, wherein the password reveal selector is displayed after at least one of the password characters is received.

3. A method as recited in claim 1, wherein the selector display condition is further based on a number of the password characters that are received, and the password reveal selector is displayed if at least a minimum number of the password characters are received.

4. A method as recited in claim 1, wherein the user input is a touch input by the user the method further comprising:
   revealing the password in the password entry box for as long as the touch input is maintained by the user.

5. A method as recited in claim 1, further comprising said revealing the password in the password entry box after a timing delay, the password revealed for as long as the user-selection of the password reveal selector is maintained by the user.

6. A method as recited in claim 5, further comprising displaying a message that indicates the password will be revealed after the timing delay.

7. A method as recited in claim 1, further comprising:
   receiving an additional user-selection of the password reveal selector; and
   said obfuscating the password characters in the password entry box based on the additional user-selection of the password reveal selector.

8. A method as recited in claim 1, wherein said revealing the password in the password entry box includes revealing the password for as long as the user continues to apply the user input as the user-selection of the password reveal selector.

9. A computing device, comprising:
   a display device configured to display a password entry box configured for input of password characters of a password;
   at least a memory and a processor to implement a text box control module that is configured to:
   instantiate the password entry box that includes a password reveal selector configured for user-selection via a user input to reveal the password characters of the password that have been entered in the password entry box, the password reveal selector initially concealed from view while the password entry box is displayed, a position of the password reveal selector based on a location that does not block a display of the password in the password entry box, the position of the password reveal selector relative to the password entry box being configurable by a user;
   initiate a display of the password reveal selector according to a selector display condition based on a parameter that indicates a maximum number of the password characters the password entry box is implemented to receive, the password reveal selector configured to display if the parameter is at least a minimum number;
   reveal the password in the password entry box for a duration of time after the user-selection of the password reveal selector is received; and
   obfuscate the password characters in the password entry box after the duration of time without receiving an additional user-selection.

10. A computing device as recited in claim 9, wherein the password reveal selector is configured to display after at least one of the password characters is received.

11. A computing device as recited in claim 9, wherein:
the selector display condition is further based on a number of the password characters that are received; and
the password reveal selector is configured to display if at least a minimum number of the password characters are received.

12. A computing device as recited in claim 9, wherein the user input is a touch input on the display device by the user; and the text box control module is further configured to:
reveal the password in the password entry box for as long as the touch input is maintained by the user.

13. A computing device as recited in claim 9, wherein the text box control module is further configured to reveal the password in the password entry box after a timing delay, the password revealed for as long as the user-selection of the password reveal selector is maintained by the user.

14. A computing device as recited in claim 13, wherein the text box control module is further configured to initiate a display of a message that indicates the password will be revealed after the timing delay.

15. A computing device as recited in claim 9, wherein the text box control module is further configured to:
receive an additional user-selection of the password reveal selector; and
obfuscate the password characters in the password entry box after the additional user-selection of the password reveal selector is received.

16. A computing device as recited in claim 9, wherein the password in the password entry box is revealed for as long as the user continues to apply the user input as the user-selection of the password reveal selector.

17. A computer-readable hardware storage memory comprising stored instructions that are executable and, responsive to executing the instructions, a computing device:
instantiates a password entry box that includes a password reveal selector configured for user-selection to reveal password characters of a password that have been entered in the password entry box, a position of the password reveal selector based on a location that does not block a display of the password in the password entry box, the position of the password reveal selector relative to the password entry box being configurable by a user;
displays the password entry box for entry of the password characters with the password reveal selector initially concealed from view while the password entry box is displayed;
responsive to a minimum number of characters being entered in the password entry box, displays the password reveal selector within the password entry box and enables selection of the password reveal selector within the password entry box;
reveals the password in the password entry box for a duration of time responsive to receiving the user-selection of the password reveal selector; and
obfuscates the password characters in the password entry box after the duration of time without receiving an additional user-selection.

18. A computer-readable hardware storage memory as recited in claim 17, further comprising additional stored instructions that are executable and, responsive to executing the additional stored instructions, the computing device displays the password reveal selector if a parameter is at least a minimum number, wherein the parameter indicates a maximum number of the password characters the password entry box is implemented to receive.

19. A computer-readable hardware storage memory as recited in claim 17, wherein the password reveal selector is displayed in a position on a right side of the password entry box.

20. A computer-readable hardware storage memory as recited in claim 17, wherein the password is revealed in the password entry box after a timing delay, the password revealed for as long as the user-selection of the password reveal selector is maintained by the user.

\* \* \* \* \*